(12) United States Patent
Johnson et al.

(10) Patent No.: US 8,641,219 B1
(45) Date of Patent: Feb. 4, 2014

(54) HIGH EFFICIENCY REAR LIT WAVEGUIDE

(75) Inventors: Ricky J. Johnson, Shellsburg, IA (US); Jon J. Freesmeier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 418 days.

(21) Appl. No.: 12/817,312

(22) Filed: Jun. 17, 2010

(51) Int. Cl.
*G09F 13/04* (2006.01)
*G09F 13/08* (2006.01)

(52) U.S. Cl.
USPC ........................................ 362/97.3

(58) Field of Classification Search
USPC ........................................ 362/97.3
See application file for complete search history.

(56) References Cited

U.S. PATENT DOCUMENTS

2004/0042194 A1* 3/2004 Hsieh .............................. 362/31
2009/0225531 A1* 9/2009 Praiswater .................... 362/97.2

* cited by examiner

*Primary Examiner* — Anh Mai
*Assistant Examiner* — Zachary J Snyder
(74) *Attorney, Agent, or Firm* — Donna P. Suchy; Daniel M. Barbieri

(57) ABSTRACT

The present invention is directed to a display assembly. The display assembly includes a display panel and a backlight module. The backlight module may be operationally coupled to the display panel and may include a light source and light guide. The light guide may be operationally coupled to the light source. The light guide may include a top surface (oriented towards the display panel) and a bottom surface (oriented towards the light source). The light source may provide a plurality of light rays to the light guide via the bottom surface of the light guide, thereby providing a rear lit wave guide (ex.—a rear lit light guide). Further, the light guide may receive the plurality of light rays and direct them, via the top surface of the light guide, to the display panel for illuminating the display panel.

17 Claims, 3 Drawing Sheets

HIGH EFFICIENCY REAR LIT WAVEGUIDE

FIELD OF THE INVENTION

The present invention relates to the field of displays and particularly to a high efficiency rear lit waveguide.

BACKGROUND OF THE INVENTION

Current display assemblies may not provide a desired level of efficiency, may be expensive to implement, may suffer from illumination non-uniformity and may be bulky and cumbersome.

Thus, it would be desirable to provide a display assembly which obviates problems associated with current solutions.

SUMMARY OF THE INVENTION

Accordingly, an embodiment of the present invention is directed to a display assembly, including: a display panel; and a backlight module, the backlight module being operationally coupled to the display panel, the backlight module including a light source and a light guide, the light guide being operationally coupled to the light source, the light source including a substrate and a plurality of lighting elements, the plurality of lighting elements being connected to the substrate, the light guide including a first surface and a second surface, the second surface being disposed generally opposite the first surface, the first surface being oriented toward the display panel, the second surface being oriented toward the light source, the light source configured for providing a plurality of light rays to the light guide via the second surface of the light guide, the light guide being configured for receiving the plurality of light rays, the light guide being configured for directing the plurality of light rays via the first surface of the light guide to the display panel for illuminating the display panel, wherein the second surface of the light guide forms a plurality of recesses.

An additional embodiment of the present invention is directed to a backlight module for a display assembly, the backlight module including: a light source, the light source including a substrate and a plurality of lighting elements, the plurality of lighting elements being connected to the substrate; and a light guide, the light guide being operationally coupled to the light source, the light guide including a first surface and a second surface, the second surface being disposed generally opposite the first surface, the first surface configured for being oriented toward a display panel of the display assembly, the second surface being oriented toward the light source, the light source configured for providing a plurality of light rays to the light guide via the second surface of the light guide, the light guide being configured for receiving the plurality of light rays, the light guide being configured for directing the plurality of light rays via the first surface of the light guide to the display panel for illuminating the display panel, wherein the second surface of the light guide forms a plurality of recesses.

A further embodiment of the present invention is directed to a display assembly, including: a display panel; a backlight module, the backlight module being operationally coupled to the display panel, the backlight module including a light source and a light guide, the light guide being operationally coupled to the light source, the light source including a substrate and a plurality of lighting elements, the plurality of lighting elements being connected to the substrate, the light guide including a first surface and a second surface, the second surface being disposed generally opposite the first surface, the first surface being oriented toward the display panel, the second surface being oriented toward the light source, the light source configured for providing a plurality of light rays to the light guide via the second surface of the light guide, the light guide being configured for receiving the plurality of light rays, the light guide being configured for directing the plurality of light rays via the first surface of the light guide to the display panel for illuminating the display panel; a diffuse reflector, the diffuse reflector being disposed between the substrate of the light source and the light guide; an NVIS filter, the NVIS filter being connected to a lighting element included in the plurality of lighting elements; a diffuser, the diffuser being disposed between the light guide and the display panel; a specular reflector, the specular reflector configured for being positioned within a recess included in the plurality of recesses of the light guide; and a diffuser reflector film layer, the diffuser reflector film layer being disposed between the specular reflector and the light guide, wherein the second surface of the light guide forms a plurality of recesses.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

As Light Emitting Diodes (LEDs) become brighter and more efficient, fewer parts are needed for Liquid Crystal Display (LCD) backlighting. Backlights, using direct illumination, may increase in thickness to maintain luminance uniformity as the LED count is reduced. Traditional edge lighting of waveguides is one method to backlight a display with a small number of LEDs. Edge lit backlights are thin and relatively uniform, but tend to be inefficient and do not work well when the display must be Night Vision Imaging System (NVIS) compliant. A rear lit waveguide approach is described herein which is thin, highly-efficient and is compatible with traditional NVIS filtering techniques.

Figure 1:
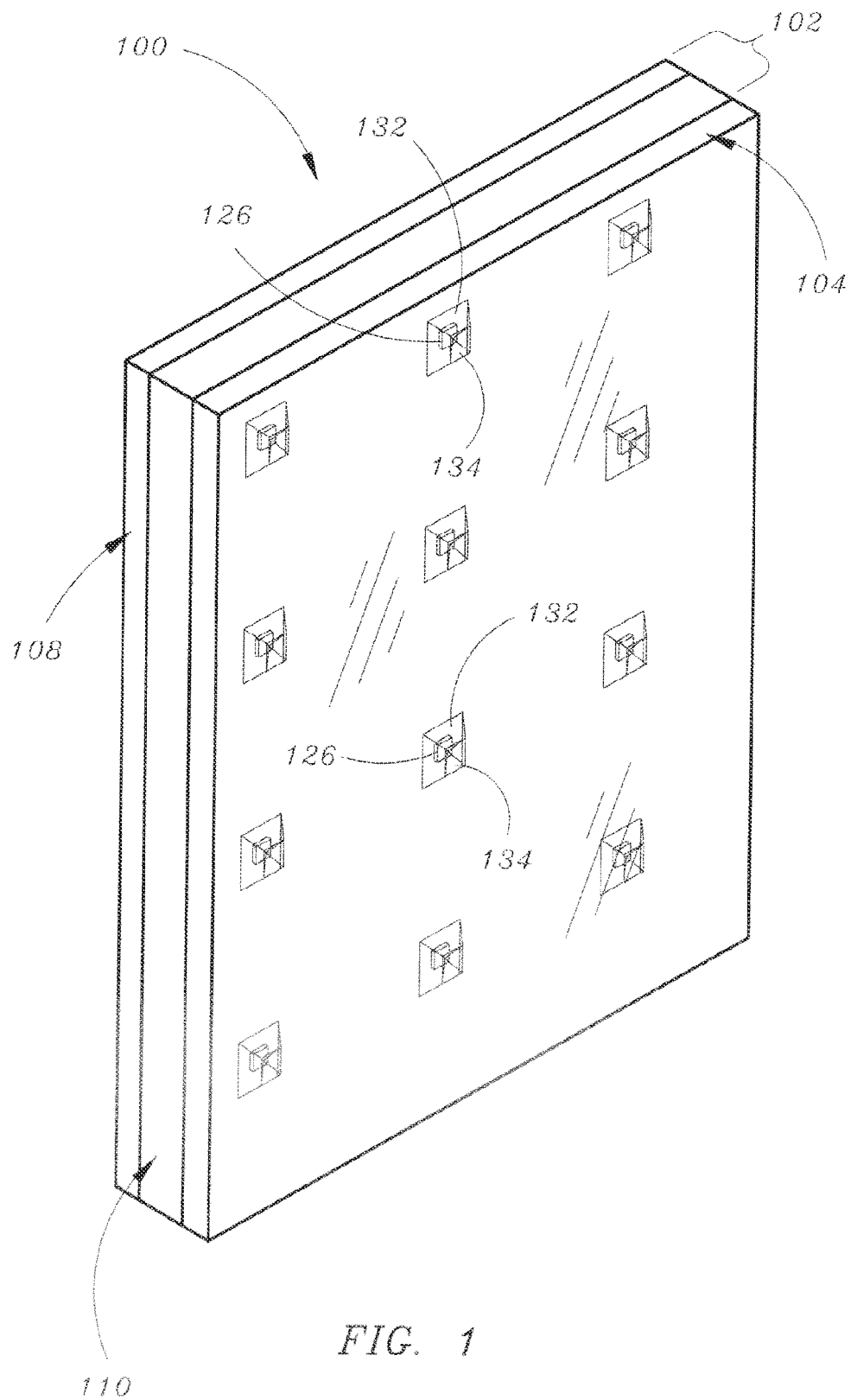
FIG. 1 is an isometric view of a display assembly in accordance with an exemplary embodiment of the present invention.
Figure 2:
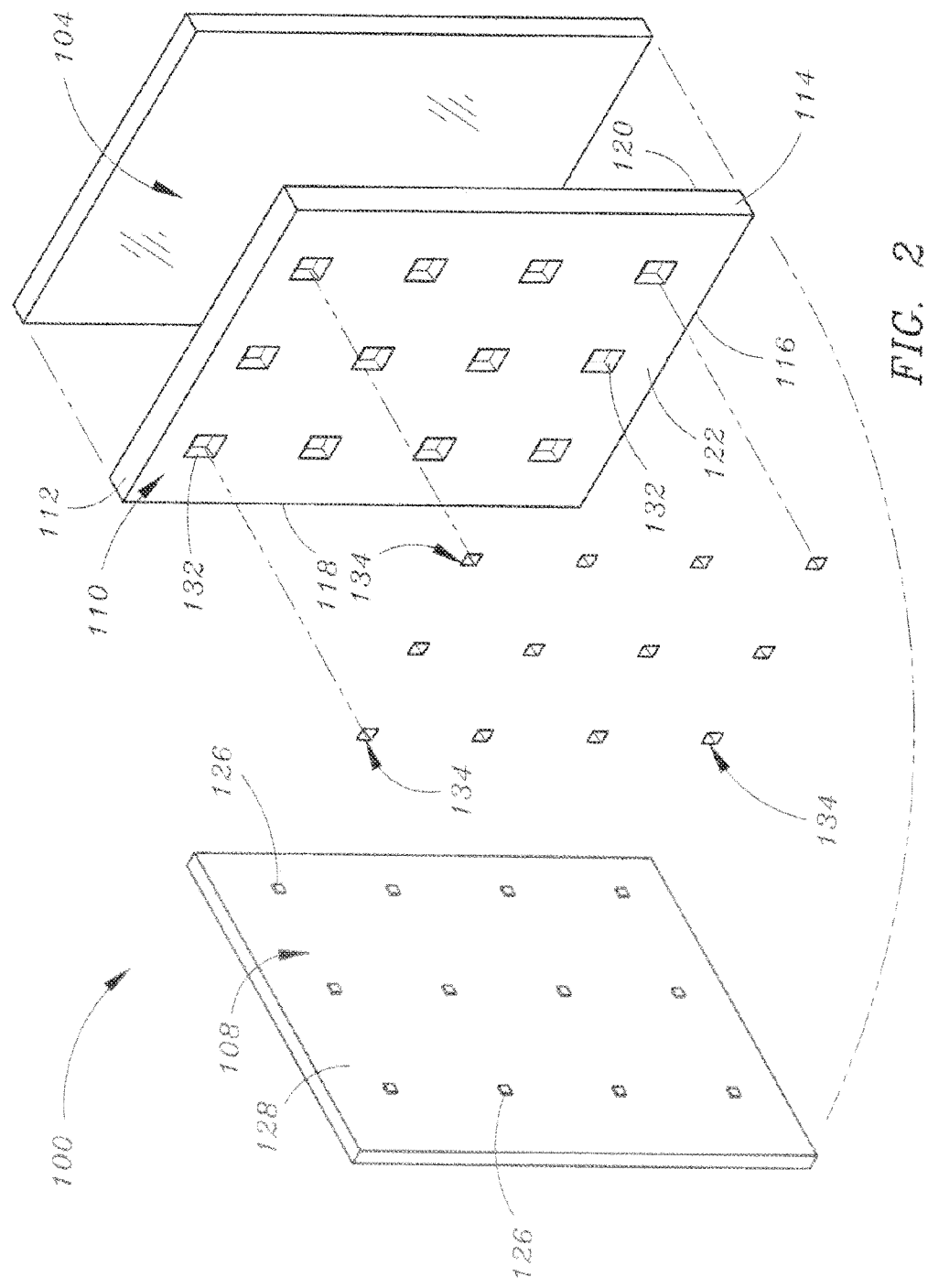
FIG. 2 is an exploded view of the display assembly shown in FIG. 1, in accordance with an exemplary embodiment of the present invention.
Figure 3A:
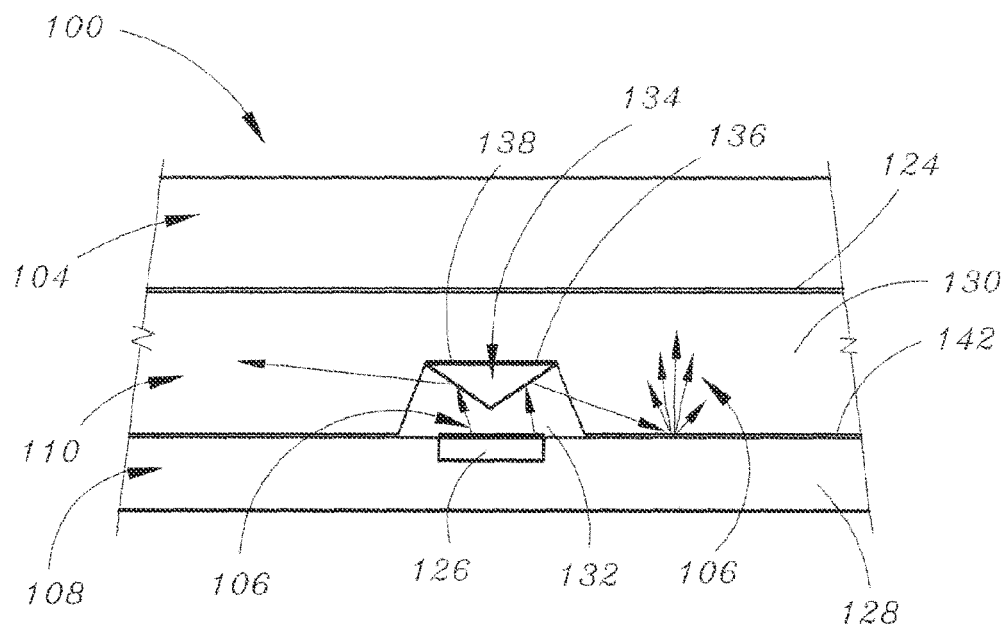
FIG. 3A is a sectional view of a display assembly, wherein a lighting element of the light source of the display assembly is shown as being embedded within the substrate of the light source of the display assembly in accordance with an exemplary embodiment of the present invention.
Figure 3B:
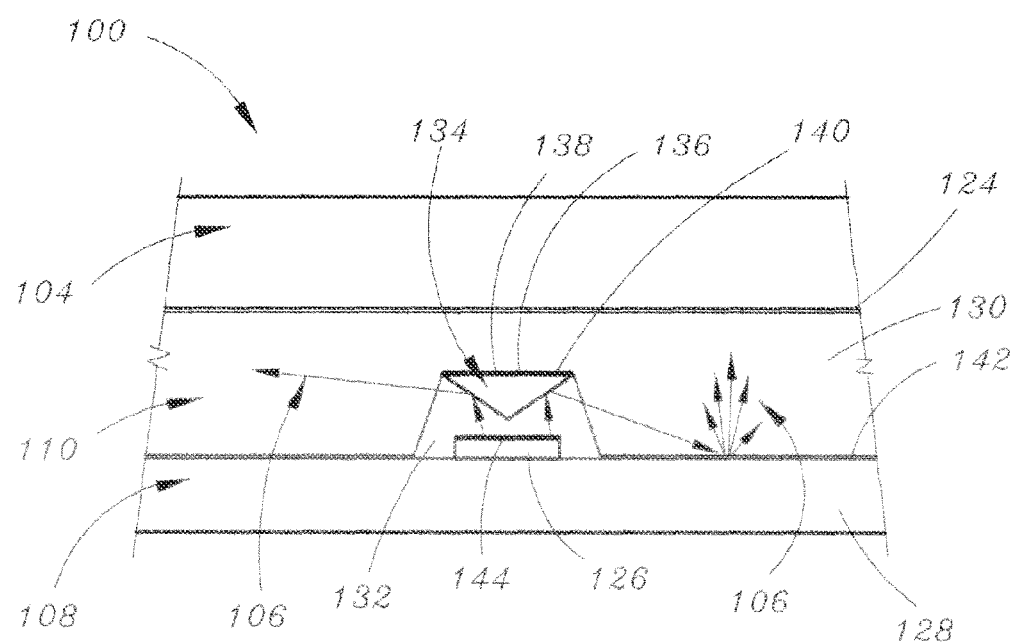
FIG. 3B is a sectional view of a display assembly, wherein a lighting element of the light source of the display assembly is shown as being mounted upon the substrate of the light source of the display assembly in accordance with an alternative exemplary embodiment of the present invention.

Referring generally to FIGS. 1, 2 and 3B, a display assembly 100 in accordance with an exemplary embodiment of the present invention is shown. In exemplary embodiments of the present invention, the display assembly 100 may be implemented in any one of a number of various operating environments. For example, the display assembly 100 may be configured for being implemented in commercial environments (ex.—televisions) and/or in military environments for displaying or providing a visual indication of information to a user who is viewing the display assembly 100. In further embodiments of the present invention, the display assembly 100 may include a backlight 102 (ex.—a backlight module 102). In still further embodiments of the present invention, the display assembly 100 may include a display 104 (exs.—a Liquid Crystal Display (LCD) 104, an LCD panel 104). In further embodiments of the present invention, the backlight 102 may be connected (ex.—operationally coupled) to the display 104. In still further embodiments of the present invention, the backlight 102 may be configured for generating and providing light 106 (exs.—light rays 106, light beams 106) and for directing the light rays 106 to (ex.—towards) the display 104 for illuminating the display 104. In further embodiments, the display 104 may be configured for receiving the light rays 106 and for allowing the light rays 106 to be emitted from (ex.—via) the display 104.

In current exemplary embodiments of the present invention, the backlight module 102 may include a light source 108 and a light guide 110 (ex.—waveguide 110). In further embodiments of the present invention (as shown in FIGS. 1-3B), the light guide 110 may be a generally rectangular-shaped body having a first edge/side 112, a second edge/side 114, a third edge/side 116, a fourth edge/side 118, a top surface 120 (ex.—surface configured for being oriented generally towards the display 104 of the assembly 100, and a bottom surface 122 (ex.—surface configured for being oriented generally away from the display panel 104 of the assembly 100). In still further embodiments of the present invention, the light guide 110 may be formed of a material such as glass or plastic (ex.—polycarbonate, acrylic, or the like). In further embodiments of the present invention, one or more film layer(s) 124 (exs.—a diffuser, diffuser film, a diffuser reflector film, a diffuse reflector, NVIS filter film) may be configured between the waveguide 110 and the display 104 (ex.—on the top surface of the light guide 110).

In exemplary embodiments of the present invention, the light source 108 may include a plurality of lighting elements 126 (ex.—light-emitting diodes (LEDs) 126) and a substrate 128. In further embodiments of the present invention, the plurality of LEDs 126 may be adhered to the substrate 128, connected to the substrate 128, embedded within the substrate 128 (as shown in FIG. 3A) and/or mounted upon the substrate 128 (as shown in FIG. 3B). For instance, the substrate 128 may be formed of metal, printed circuit board material, and/or the like. In still further embodiments of the present invention, the lighting elements/LEDs 126 of the light source 108 may be directed toward (exs.—oriented toward or faced toward) a light incident surface (ex.—the bottom surface 122) of the light guide 110. In further embodiments of the present invention, the substrate 128 and the lighting elements 126 of the light source 108 may be connected (ex.—operationally coupled) to the light guide 110 and may be configured for directing light toward the bottom surface 122 of the light guide 110 so that said light 106 enters into an interior region 130 of the light guide 110 via the bottom surface 122 of the light guide 110 (ex.—via recesses 132 formed by the bottom surface 122 of the light guide 110), thereby providing a rear lit light guide 110.

As mentioned above, in current exemplary embodiments of the present invention, the bottom surface 122 of the light guide 110 may form a plurality of recesses 132 via which light 106 may enter into the interior region 130 of the light guide 110. For example, each recess 132 may be a notched recess and may be sized and shaped for aligning with an LED 126 (ex.—so that the light may be directed from the LED 126 into the recess 132) and may be further configured for at least partially receiving an LED 126 (as shown in FIG. 3B) when the light source 108 and light guide 110 are connected (exs.—assembled, coupled). In further embodiments of the present invention, the assembly 100 may include one or more specular reflectors 134. For instance, each specular reflector 134 may be a cone-shaped element 134 which may be sized and shaped so as to be configured for being positioned within the recesses 132 formed by the light guide 110 (as shown in FIGS. 3A and 3B), such that light 106 from the LEDs 108 may be directed into the interior region 130 of the light guide 110 via the specular reflector 134. In still further embodiments of the present invention, the specular reflector 134 may be oriented within the recess 132 such that the bottom surface 136 (ex.—base 136) of the cone 134 is oriented toward (ex.—against) a top wall 138 formed by the recess 132. In further embodiments of the present invention, the specular reflector 134 may provide a reflecting surface(s) which give a direct image of the source with the angle of reflection equal to the angle of incidence. For instance, the specular reflector 134 (ex.—the cone 134) may be formed of polished metal or silvered glass, and/or may have a film layer configured upon it. In further embodiments of the present invention, the specular reflector 134 may be a Distributed Bragg Reflector (DBR), may be formed of organic layers, inorganic layers, a layer of aluminum, a layer of other reflective material, and/or the like. In still further embodiments of the present invention, a layer of diffuser reflector film 140 may be configured between one or more of the specular reflectors 134 and the corresponding top walls 138 formed by the recesses 132. As mentioned above, the specular reflector 134 may be a cone-shaped element 134 which may be sized and shaped so as to be configured for being positioned within a correspondingly-shaped and sized recess 132 formed by the light guide 110 (ex.—the recess 132 may also be cone-shaped. In alternative embodiments of the present invention, the specular reflector 134 may be a pyramidal-shaped element 134, or a circular-shaped element 134 which may be sized and shaped so as to be configured for being positioned within a correspondingly-shaped (exs.—pyramidal-shaped, circular-shaped) recess 132 formed by the light guide. In further alternative embodiments, the specular reflector 134 and recesses 132 may be any one of a number of various other corresponding shapes.

In exemplary embodiments of the present invention, a diffuse reflector 142 (ex.—diffuser reflector film) may be configured on the bottom surface 122 of the light guide 110, such that said diffuse reflector 142 is disposed between the light guide 110 and the PCB 128. In further embodiments of the present invention, the diffuse reflector 142 may be configured for being or acting as an extraction mechanism for promoting the extraction of the light rays 106 from the light guide 110 so that said light rays 106 may reach (ex.—may be directed to) the display 104 for illuminating said display 104 (as shown in FIGS. 3A and 3B). For instance, a diffuse reflector 142 may be a surface having irregularities that are so large compared to a wavelength of incident radiation that reflected rays are sent back in a multiplicity of directions. In further embodiments, the diffuse reflector may be formed of a metal deposited on a roughened surface or a diffusing material such as a suitable white paint or a sol-gel solution with Titanium dioxide in silicone, or a Gore laminate.

In current exemplary embodiments of the present invention, the number and arrangement of lighting elements 126 (ex.—LEDs 126) which may be implemented in the display assembly 100 may vary. For example, in at least one embodiment of the present invention, as few as twelve LEDs 126 may be implemented, said LEDs 126 being arranged (exs.—located, mounted, configured, positioned) upon the substrate 128 in a two-dimensional (ex.—columns and rows) array, as shown in FIG. 2. In further embodiments of the present invention, the substrate 128 (ex.—PCB 128) upon which the LEDs 126 are mounted may be of varying dimensions, depending upon how many LEDs 126 are being implemented. For example, the PCB 128 may occupy a six inch-by-eight inch footprint. In still further embodiments of the present invention, an NVIS filter 144 (exs.—a lens, a cap, a film layer) may be operationally coupled with (exs.—connected to, placed onto, placed over) one or more of the LEDs 126 of the light source 108.

In exemplary embodiments of the present invention, the display assembly 100 may be a low-profile (ex.—thin) display assembly 100 having a thickness of less than one-half inch. In further embodiments of the present invention, the waveguide 110 may be a low-profile waveguide 110 (ex.—may have a thickness in the range of 3-6 millimeters). In still further embodiments of the present invention, the display assembly 100 has a high efficiency (ex.—greater than 80%) and reduced power consumption. In further embodiments of the present invention, the display assembly 100 is compatible with traditional NVIS filtering techniques, thus providing for low cost NVIS filtering. In still further embodiments of the present invention, the backlight module 102 of the display assembly 100 may implement a relatively small number of LEDs 126 compared to a number of currently available backlight modules, thereby providing a relatively low cost display assembly 100.

In further embodiments of the present invention, one or more of the edges/sides (112, 114, 116, 118) of the light guide 110 may be formed of or may have configured thereon a reflective material (ex.—a reflective coating). The reflective material may be configured for promoting the prevention of the escape of the light 106 from the light guide 110 via the edges (112, 114, 116, 118), so as to increase the amount of said light 106 which may be extracted from the interior region 130 of the light guide 110 and directed to the display 104 for illuminating said display 104.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A display assembly, comprising:
    a display panel;
    a backlight module, the backlight module being operationally coupled to the display panel, the backlight module including a light source and a light guide, the light guide being operationally coupled to the light source, the light source including a substrate and a plurality of lighting elements, the plurality of lighting elements being connected to the substrate, the light guide including a first surface and a second surface, the second surface being disposed generally opposite the first surface, the first surface being oriented toward the display panel, the second surface being oriented toward the light source, the light source configured for providing a plurality of light rays to the light guide via the second surface of the light guide, the light guide being configured for receiving the plurality of light rays, the light guide being configured for directing the plurality of light rays via the first surface of the light guide to the display panel for illuminating the display panel, wherein the second surface of the light guide forms a plurality of recesses;
    an NVIS filter, the NVIS filter being connected to a lighting element included in the plurality of lighting elements; and
    a specular reflector, the specular reflector configured for being positioned within a recess included in the plurality of recesses of the light guide.

2. A display assembly as claimed in claim 1, wherein the light guide is a generally rectangular-shaped body including a first side, a second side, a third side, a fourth side, the first surface and the second surface.

3. A display assembly as claimed in claim 1, wherein the light guide is formed of one of: glass and plastic.

4. A display assembly as claimed in claim 1, wherein the second surface of the light guide forms a plurality of recesses.

5. A display assembly as claimed in claim 1, further comprising:
    a diffuse reflector, the diffuse reflector being disposed between the substrate of the light source and the light guide.

6. A display assembly as claimed in claim 1, further comprising:
    a diffuser, the diffuser being disposed between the light guide and the display panel.

7. A display assembly as claimed in claim 1, wherein the lighting elements are Light Emitting Diodes.

8. A display assembly as claimed in claim 1, wherein the substrate is formed of Printed Circuit Board.

9. A display assembly as claimed in claim 1, further comprising:
    a diffuser reflector film layer, the diffuser reflector film layer being disposed between the specular reflector and the light guide.

10. A backlight module for a display assembly, the backlight module comprising:
    a light source, the light source including a substrate and a plurality of lighting elements, the plurality of lighting elements being connected to the substrate; and a light guide, the light guide being operationally coupled to the light source, the light guide including a first surface and a second surface, the second surface being disposed generally opposite the first surface, the first surface configured for being oriented toward a display panel of the display assembly, the second surface being oriented toward the light source, the light source configured for providing a plurality of light rays to the light guide via the second surface of the light guide, the light guide being configured for receiving the plurality of light rays, the light guide being configured for directing the plurality of light rays via the first surface of the light guide to the display panel for illuminating the display panel, wherein the second surface of the light guide forms a plurality of recesses;

an NVIS filter, the NVIS filter being connected to a lighting element included in the plurality of lighting elements; and a specular reflector, the specular reflector configured for being positioned within a recess included in the plurality of recesses of the light guide.

11. A backlight module as claimed in claim 10, wherein the light guide is formed of acrylic.

12. A backlight module as claimed in claim 10, further comprising:

a diffuse reflector, the diffuse reflector being disposed between the substrate of the light source and the light guide.

13. A backlight module as claimed in claim 10, further comprising:

a diffuser, the diffuser being disposed between the light guide and the display panel.

14. A backlight module as claimed in claim 10, wherein the lighting elements are Light Emitting Diodes.

15. A backlight module as claimed in claim 10, wherein the substrate is formed of Printed Circuit Board.

16. A backlight module as claimed in claim 10, further comprising:

a diffuser reflector film layer, the diffuser reflector film layer being disposed between the specular reflector and the light guide.

17. A display assembly, comprising:

a display panel;

a backlight module, the backlight module being operationally coupled to the display panel, the backlight module including a light source and a light guide, the light guide being operationally coupled to the light source, the light source including a substrate and a plurality of lighting elements, the plurality of lighting elements being connected to the substrate, the light guide including a first surface and a second surface, the second surface being disposed generally opposite the first surface, the first surface being oriented toward the display panel, the second surface being oriented toward the light source, the light source configured for providing a plurality of light rays to the light guide via the second surface of the light guide, the light guide being configured for receiving the plurality of light rays, the light guide being configured for directing the plurality of light rays via the first surface of the light guide to the display panel for illuminating the display panel;

a diffuse reflector, the diffuse reflector being disposed between the substrate of the light source and the light guide;

an NVIS filter, the NVIS filter being connected to a lighting element included in the plurality of lighting elements;

a diffuser, the diffuser being disposed between the light guide and the display panel;

a specular reflector, the specular reflector configured for being positioned within a recess included in the plurality of recesses of the light guide; and a diffuser reflector film layer, the diffuser reflector film layer being disposed between the specular reflector and the light guide, wherein the second surface of the light guide forms a plurality of recesses.

\* \* \* \* \*